(12) United States Patent
König et al.

(10) Patent No.: US 9,657,752 B2
(45) Date of Patent: May 23, 2017

(54) MASTER CYLINDER FOR A REGULATED BRAKING SYSTEM

(75) Inventors: Harald König, Ober-Mörlen (DE); Andreas Bischoff, Bad Vilbel (DE); Peter Drott, Frankfurt am Main (DE); Makato Inaba, Yokohama (JP); Heinrich Kreh, Florstadt (DE); Udo Jungmann, Mörfelden (DE); Filip Janosek, Novy Bydzov (CZ)

(73) Assignee: Continental Teves AG & Co. oHG, Frankfurt (DE)

( * ) Notice: Subject to any disclaimer, the term of this patent is extended or adjusted under 35 U.S.C. 154(b) by 1011 days.

(21) Appl. No.: 13/515,898

(22) PCT Filed: Dec. 15, 2010

(86) PCT No.: PCT/EP2010/069729
§ 371 (c)(1),
(2), (4) Date: Dec. 20, 2012

(87) PCT Pub. No.: WO2011/082999
PCT Pub. Date: Jul. 14, 2011

(65) Prior Publication Data
US 2013/0213033 A1    Aug. 22, 2013

(30) Foreign Application Priority Data

Dec. 15, 2009    (DE) .................. 10 2009 054 695

(51) Int. Cl.
*F15B 7/10*    (2006.01)
*F15B 15/00*    (2006.01)
(Continued)

(52) U.S. Cl.
CPC ............ *F15B 15/00* (2013.01); *B60T 11/101* (2013.01); *B60T 11/16* (2013.01); *B60T 11/232* (2013.01); *B60T 11/236* (2013.01)

(58) Field of Classification Search
CPC ........... B60T 11/16; B60T 11/101; F15B 7/10
(Continued)

(56) References Cited

U.S. PATENT DOCUMENTS 4,945,728 A * 8/1990 Coleman ............... B60T 11/236
                                                      277/572
4,998,461 A * 3/1991 Ishiwata et al. ................. 92/248
(Continued)

FOREIGN PATENT DOCUMENTS

CN        1902071 A      1/2007
CN      101184659 A      5/2008
(Continued)

OTHER PUBLICATIONS

International Application Serial No. PCT/EP2010/069729, European Search Report mailed Apr. 5, 2011, 4 pgs.
(Continued)

*Primary Examiner* — Thomas E Lazo
*Assistant Examiner* — Daniel Collins
(74) *Attorney, Agent, or Firm* — RatnerPrestia

(57) ABSTRACT

A master cylinder for a regulated braking system having at least one piston, which is movable in a housing and which is sealed from a pressure chamber by a sealing element arranged in a ring groove of the housing, which can be connected to an unpressurized supply chamber by control passages designed in the pistons. In order to reduce the flow resistance of the control passages at the same dead stroke, the control passages have a control edge designed parallel to a piston end face of at least one of the pistons.

8 Claims, 4 Drawing Sheets

(51) Int. Cl.
    *B60T 11/10*     (2006.01)
    *B60T 11/16*     (2006.01)
    *B60T 11/232*    (2006.01)
    *B60T 11/236*    (2006.01)

(58) Field of Classification Search
    USPC .................................................. 60/562, 589
    See application file for complete search history.

(56) References Cited

U.S. PATENT DOCUMENTS

| | | | |
|---|---|---|---|
| 2005/0268608 A1* | 12/2005 | Ludsteck | F16D 25/088 60/533 |
| 2008/0022675 A1 | 1/2008 | Drott | |
| 2008/0098886 A1* | 5/2008 | Lindsten et al. | 92/248 |
| 2008/0126473 A1 | 5/2008 | Ikenaga | |
| 2009/0090105 A1 | 4/2009 | Taira | |
| 2009/0210124 A1* | 8/2009 | Schonlau et al. | 701/70 |
| 2010/0287931 A1* | 11/2010 | Kim | B60T 11/236 60/591 |

FOREIGN PATENT DOCUMENTS

| | | |
|---|---|---|
| DE | 102004057137 A1 | 8/2005 |
| DE | 102009004717 A1 | 7/2009 |
| EP | 1889767 A1 | 2/2008 |
| JP | 2007513831 | 5/2007 |
| JP | 2007517724 | 7/2007 |
| KR | 20080086654 A | 9/2008 |
| WO | WO-2005066005 A1 | 7/2005 |
| WO | 2006126619 | 11/2006 |

OTHER PUBLICATIONS

First Office Action of Chinese Application No. 201080056475.2 dated Mar. 31, 2014.
Japanese Office Action mailed Jan. 27, 2015 in Japanese Application No. 2012-543711.
Korean Office Action dated Jun. 26, 2016 for Korean Application No. 10-2012-7017940, including English translation, 8 pages.

* cited by examiner

MASTER CYLINDER FOR A REGULATED BRAKING SYSTEM

CROSS REFERENCE TO RELATED APPLICATIONS

This application is the U.S. National Phase Application of PCT International Application No. PCT/EP2010/069729, filed Dec. 15, 2010, which claims priority to German Patent Application No. 10 2009 054 695.2, filed Dec. 15, 2009, the contents of such applications being incorporated by reference herein.

FIELD OF THE INVENTION

The invention relates to a master cylinder for a regulated braking system having at least one piston, which is movable in a housing and which is sealed off by means of a sealing element arranged in an annular groove of the housing from a pressure chamber, which can be connected to an unpressurized replenishment chamber by means of control passages formed in the piston.

BACKGROUND OF THE INVENTION

A master cylinder of this kind is known from DE 10 2004 057 137 A1, which is incorporated by reference, for example, wherein the control passages are provided as radial transverse holes of small cross section and an encircling inner groove is formed on an inner side in the region of the transverse holes in order to minimize the idle travel of the master cylinder and, at the same time, to reduce the throttling resistance by reducing the length of the transverse holes.

In the case of use in a regulated braking system, such as a braking system with anti-slip regulation (ASR) or an electronic stability program (ESP), additional pressure medium is drawn in from a pressure medium reservoir via the master cylinder by a pump in the case of a control intervention. The disadvantage here is that the small cross section of the transverse holes produces an excessive flow resistance, and the pressure medium required cannot be made available quickly enough to the pump.

In order to reduce the flow resistance, there is the possibility, in the case of the known master cylinders, of providing a larger number of transverse holes or of optimizing the transverse holes in respect of the diameter thereof. However, a disadvantage of the first-mentioned solution is found to be the fact that the flow resistance is reduced in favor of the stability of the piston and, furthermore, that the provision of a large number of small transverse holes is economically disadvantageous. The second solution has the disadvantage that the idle travel (closing travel) of the master cylinder is increased by displacing the controlling lateral edge of the holes.

SUMMARY OF THE INVENTION

It is therefore the underlying aim of the invention to provide a master cylinder which is improved in respect of the stated disadvantages of the known master cylinder.

According to aspects of the invention, this aim is achieved by virtue of the fact that the control passages of at least one of the pistons have a control edge formed parallel to a piston end face. This makes it possible to increase the flow cross section of the control passages while keeping the closing travel the same, thereby making it possible to improve dynamic behavior during control interventions.

The control passages are preferably provided as axial grooves on an outer side of the piston. The axial grooves offer the advantage that defined guidance of the sealing element on the outer side of the piston is ensured.

A large contact area of the piston with the sealing element or the inner sealing lip thereof and, at the same time, a large groove cross section can be achieved if the axial grooves are provided in a dovetail shape.

In contrast, an alternative embodiment of the invention makes provision for the control passages to be provided as radial apertures in the piston. Here too, guidance for the sealing element on the piston is provided.

Parallelism can be produced in a simple manner if the control passages are provided in the piston by stamping.

According to an advantageous embodiment of the invention, the piston is made of plastic, making the piston simple and economical to produce.

Another advantageous embodiment envisages that the piston is produced by means of an extrusion process.

The piston is preferably of cup-shaped design with a bottom, and a first, centrally arranged fixing element for a return spring of the piston is provided on an inner side of the bottom.

If the master cylinder has a sensor arrangement for monitoring the position and movement of a piston, then, according to an advantageous embodiment, a second, centrally arranged fixing element for a magnetic guide element is provided on an outer side of the bottom.

BRIEF DESCRIPTION OF THE DRAWINGS

The invention is best understood from the following detailed description when read in connection with the accompanying drawings. Included in the drawings is the following figures.

In the drawing, in which each of the figures is highly schematized.

DETAILED DESCRIPTION OF THE PREFERRED EMBODIMENTS

Figure 1:
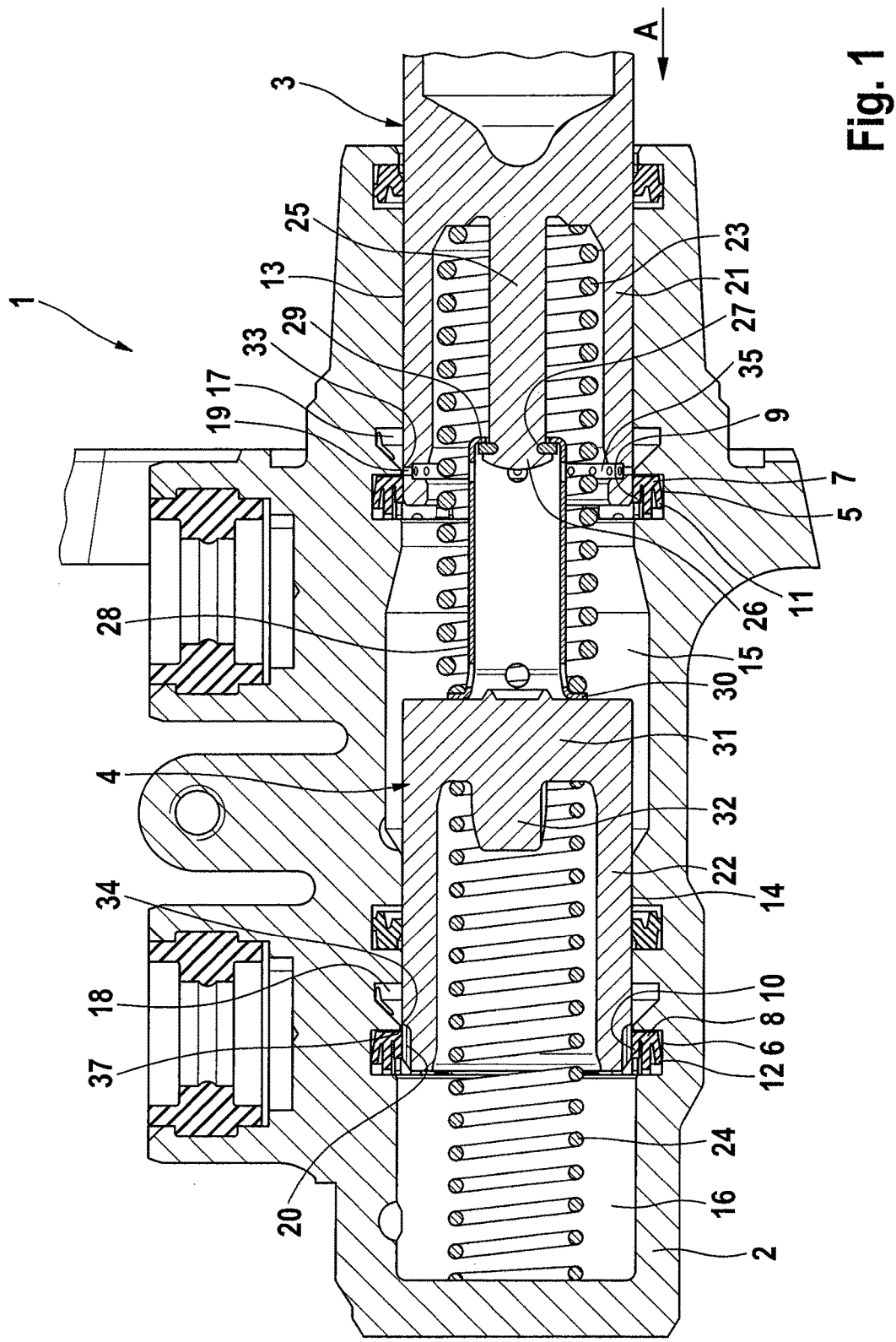
FIG. 1 shows a master cylinder according to aspects of the invention in a first illustrative embodiment, having a first and a second piston, in longitudinal section.

FIG. 1 shows a longitudinal section through a master cylinder 1 according to aspects of the invention in a first illustrative embodiment, which is used in a regulated braking system with anti-slip regulation (ASR) and/or an electronic stability program (ESP), for example, and is of plunger- and tandem-type design.

The master cylinder 1 comprises a first and a second piston 3, 4, which is movable in a housing 2, wherein a sealing element 7, 8 in the form of a circular ring and having an inner sealing lip 9, 10 subject to dynamic forces and an outer sealing lip 11, 12 subject to static forces is provided in an annular groove 5, 6 of the housing 2. The inner sealing lip 9, 10 subject to dynamic forces rests by means of a first sealing surface on the piston 3, 4, and the outer sealing lip 11, 12 subject to static forces rests by means of a second sealing surface on a bottom of the annular groove 5, 6. An outer side 13, 14 of the pistons 3, 4 serves as a guide surface.

In an unactuated state of the master cylinder 1, which is illustrated in FIG. 1, a first and a second pressure chamber 15, 16 are connected to an unpressurized pressure medium reservoir (not shown) via a pressure medium channel (not shown) and a replenishment chamber 17, 18 in the housing 2 and via control passages 19, 20 in a cup-shaped wall 21, 22 of the first and the second piston 3, 4. In this arrangement, the pistons 3, 4 are preloaded by means of return springs 23, 24.

The return spring 23, 24 is in each case arranged at least partially within the cup-shaped wall 21, 22. As can be seen from FIG. 1, a centric peg 25 projects centrally within the wall 21 of the first piston 3, said peg ending before it emerges axially from the wall 21. This end 26 is provided with a stop 27 for a sleeve 28, which interacts with a collar 29 in such a way that the sleeve 28 can be telescoped to a limited extent relative to the peg 25. In other words, the sleeve 28 is urged into the interior of the piston by the return spring 23 upon actuation. As is apparent, the stop 27 is preferably an annular disk, which is riveted—in particular wobble-riveted—to the peg 25. The other end of the sleeve 28 has the dish-type collar 29 for contact with the return spring 23.

At the bottom 31 of the second piston 4, said piston has a first fixing element 32, which extends centrally within the wall 22 from an inner side of the bottom 31 in order to fix and position the return spring 24.

To actuate the master cylinder 1, the first piston 3 is moved in actuating direction A. During this process, the movement of the first piston 3 is transmitted to the second piston 4 by the return spring 23. As soon as the control edges 33, 34 (described in greater detail below) of the control passages 19, 20 are in the region of the sealing elements 7, 8, i.e. the control edges 33, 34 have been crossed, the "idle travel" (closing travel) of the master cylinder 1 has been traversed since no more pressure medium can pass from the replenishment chambers 17, 18 into the pressure chambers 15, 16 via the control passages 19, 20. The connection between the pressure chambers 15, 16 and the pressure medium reservoir is interrupted, and pressure is built up in the pressure chambers 15, 16.

In the case of an ASR or ESP intervention, it may be necessary to draw additional pressure medium in the direction of the wheel brakes from the pressure medium reservoir via the pressure chamber or chambers 15, 16, whether the pistons 3, 4 are actuated or unactuated, this preferably being accomplished by means of a pump, the inlet of which can be connected either to the pressure chambers 15, 16 of the master cylinder 1 or to the wheel brakes in order to deliver in the direction of the wheel brakes or in the direction of the master cylinder 1 (recirculation principle). For this purpose, the additional pressure medium is drawn from the pressure medium reservoir via the pressure medium channels, the replenishment chambers 17, 18, the control passages 19, 20 and the pressure chambers 15, 16 in the case of an ASR or ESP intervention in the unactuated state of the master cylinder 1. In the case of an ESP intervention in the actuated state of the master cylinder 1, additional pressure medium is also drawn in by flow across the outer sealing lips 11, 12 of the sealing elements 7, 8 since they are folded over in the direction of the inner sealing lips 9, 10 by the intake pressure and, as a result, the sealing surface of the outer sealing lip 11, 12 no longer rests on the bottom of the annular groove 5, 6. In order to make available sufficient pressure medium quickly to the pump in the case of an ASR or ESP intervention, especially in the unactuated state of the master cylinder 1, it is necessary to minimize the flow resistance of the control passages 19, 20, although the idle travel of the master cylinder 1 should also be kept as small as possible.

In the region of the control passages 19 of the first piston 3, a radial encircling inner groove 35 is provided on an inner side of the piston 3 in order to reduce the throttling resistance, said groove shortening the length of the control passages 19, which are provided as radial transverse holes.

Figure 2:
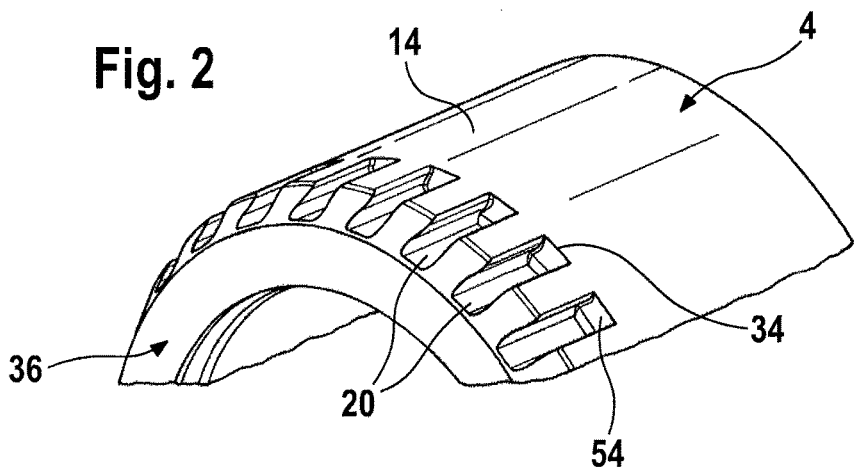
FIG. 2 shows a partial view of the second piston in accordance with FIG. 1 in three-dimensional representation.
Figure 3:
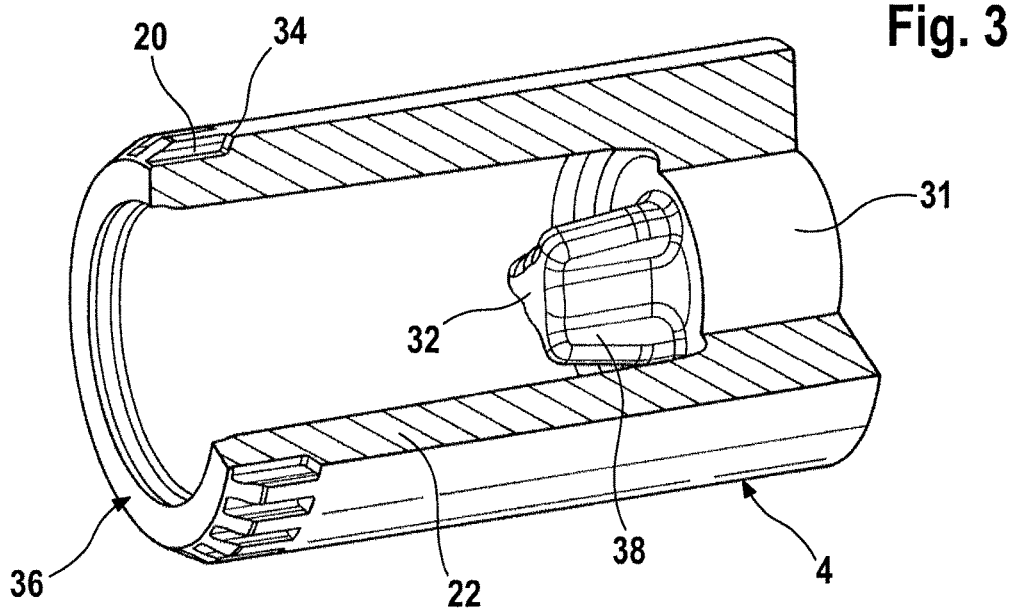
FIG. 3 shows another partial view of the second piston in accordance with FIG. 1 in three-dimensional representation and in partial section.
Figure 4:
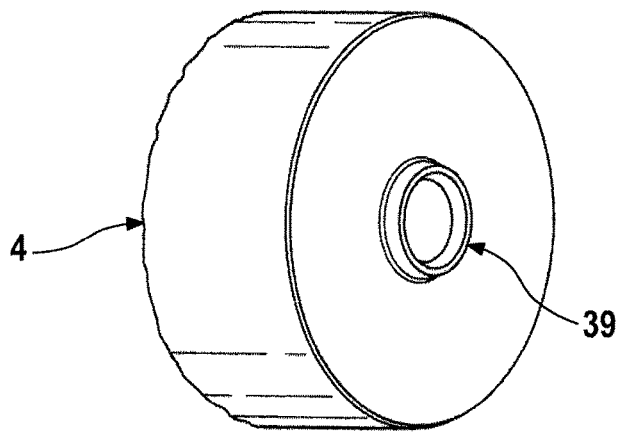
FIG. 4 shows another partial view of the second piston in accordance with FIG. 1 in three-dimensional representation.

FIGS. 2 to 4 show partial views of the second piston 4 in an enlarged, partially sectioned three-dimensional representation.

In order to enlarge the area of flow of the control passages 20 of the second piston 4, the control passages 20 have a control edge 34 which is formed parallel to a piston end face 36. This makes it possible to enlarge the flow cross section of the control passages 20 while keeping the closing travel the same, thus enabling the dynamic behavior of the master cylinder 1 to be improved during control interventions.

As is apparent, the control passages 20 according to the illustrative embodiment shown are designed as axial grooves on the outer side 14 of the piston 4. These can be introduced into the piston 4 in a simple manner, e.g. by forming or stamping, if the piston 4 is made of plastic, making the piston 4 simple and economical to produce. The stability of the piston 4 is not affected by the axial grooves since the piston 4 can have a relatively thick wall 22, without disadvantages in respect of weight and other necessary properties.

An alternative embodiment envisages that the piston 4 be produced by means of an extrusion process. Aluminum can be provided as a material in this case, for example. Here too, the parallel control edges 34 and also the axial grooves can be provided in a simple manner.

As shown in FIG. 3, one groove end 54 of the axial grooves can be of tapered design, and an embodiment with a radius (convex or concave) is likewise conceivable within the scope of the invention. Different groove shapes are also possible. These can be introduced into the piston 4 in a substantially dovetail shape, for example, as shown. The dovetail groove shape has the advantage that the contact surface of the piston 4 with the sealing element 8 or the inner sealing lip 10 thereof is enlarged and, at the same time, a large flow cross section can be formed through an enlarged diameter of the groove at the groove base.

However, rectangular, undulating, round or V-shaped grooves are also possible.

The control passages 20 described furthermore have the advantage that a collar heel 37 of the sealing element 8 is guided in a defined manner on the outer side 14 of the piston 14 and cannot enter the control passages 20. Such a risk would exist in the case of an encircling groove, for example.

As can be seen from FIG. 3, the first fixing element 32 is provided in the form of three arms, wherein the individual arms 38 are of beveled design to simplify the installation and positioning of the return spring 24.

FIG. 4 shows an external view of the bottom 31 of the second piston 4. It is apparent that a second, centrally arranged fixing element 39 in the form of a circular projection extends from an outer side of the bottom 31. This performs its function when, in accordance with the second embodiment described below and shown in FIG. 5, the master cylinder 1 has a sensor arrangement for monitoring the position and movement of the piston 3, and a magnetic guide element 40 rests on the second piston 4.

Figure 5:
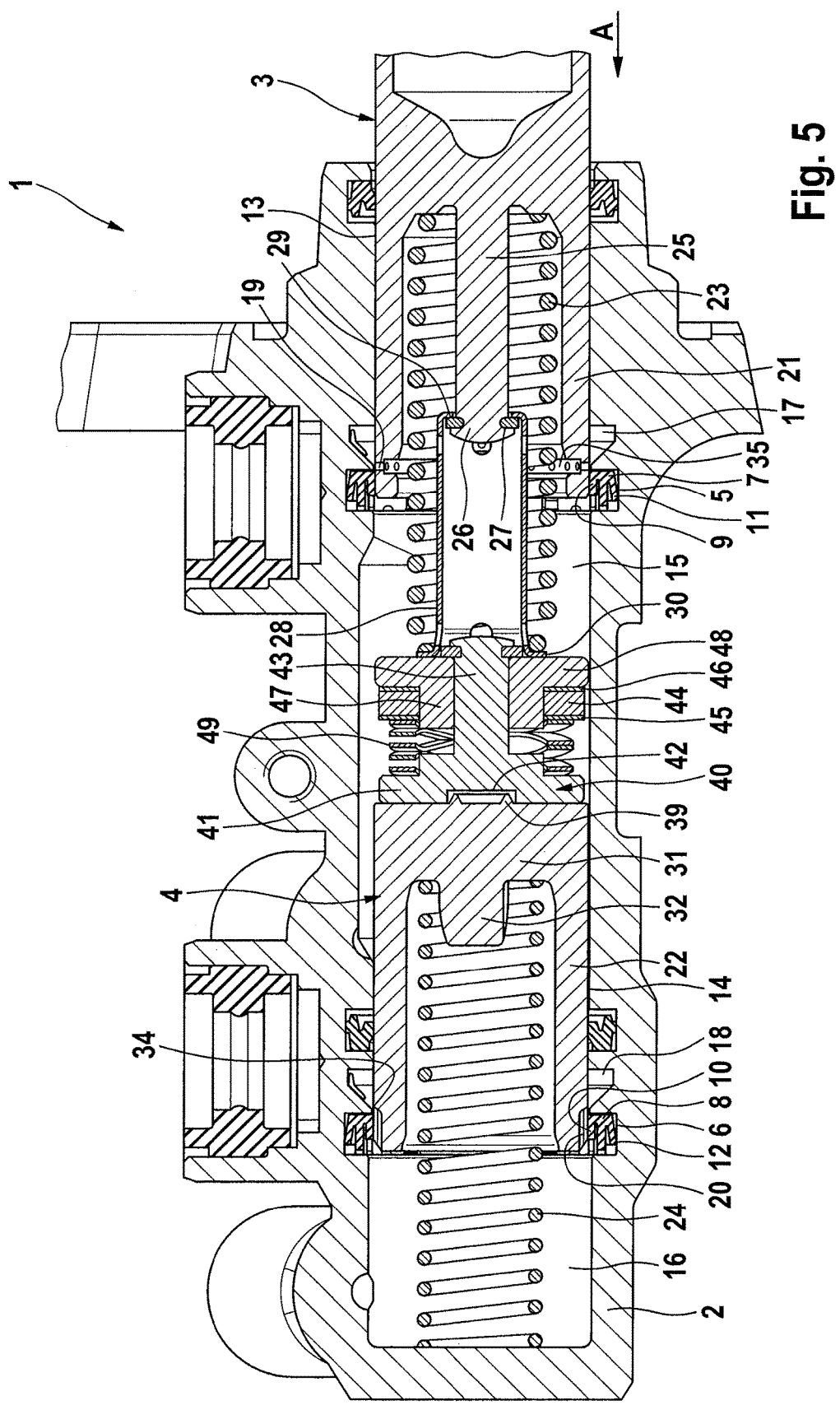
FIG. 5 shows a master cylinder according to aspects of the invention in a second illustrative embodiment, having a first and a second piston, in longitudinal section.

The magnetic guide element 40 illustrated in FIG. 5 rests by means of a flange-shaped portion 41 on the bottom 31 of the second piston 4. Provided in the flange-shaped portion 41 is a recess 42, which corresponds to the second fixing element 39 and by means of which the magnetic guide element 40 is fixed and positioned on the second piston 4.

The magnetic guide element 40 additionally has a peg-shaped portion 43 which points in the opposite direction to the peg 25 of the first piston 3 and which serves as a means for guiding a permanent magnet 44.

The magnet 44 serves as a signal transmitter for a position transmitter and generates a magnetic field radially in the direction of a sensor element (not shown)—preferably in the form of a Hall-effect sensor, a magnetoresistive sensor or a reed contact—which is provided at a fixed location on the housing 2 and can be connected to an electronic control unit (not shown) in order to permit position detection.

The magnet 44 is ring-shaped and, as is apparent, is arranged between disks 45, 46 of magnetic material on a cylindrical support 47 made of nonmagnetic material, which has a collar 48 for axial support of the magnet 44.

As is apparent from FIG. 5, the support 47 with the magnet 44 is acted upon, on the one hand, by the return spring 23 of the first piston 3 and, on the other hand, by another spring means 49, which is supported on the second piston 4, with the result that the magnet 44 is as it were clamped between the pistons 3, 4 and movable relative to the latter. However, the spring force of the return spring 23 is greater than the spring force of the other spring means 49. This allows an actuation-induced displacement of the magnet 44, even if the second piston 4 is fixed immovably due to a regulating operation affecting the vehicle dynamics.

In addition to the improvement in dynamics, the embodiment described of the second piston 4 in the two illustrative embodiments offers the additional advantages that, for example, the overall length of the master cylinder 1 can be shortened by means of a shorter return spring 24, and the master cylinder 1 has fewer individual components overall. It is furthermore also possible, within the scope of the invention, to design the first piston 3 with the control passages 20 described in the form of axial grooves and with the first fixing element 32.

Figure 6:
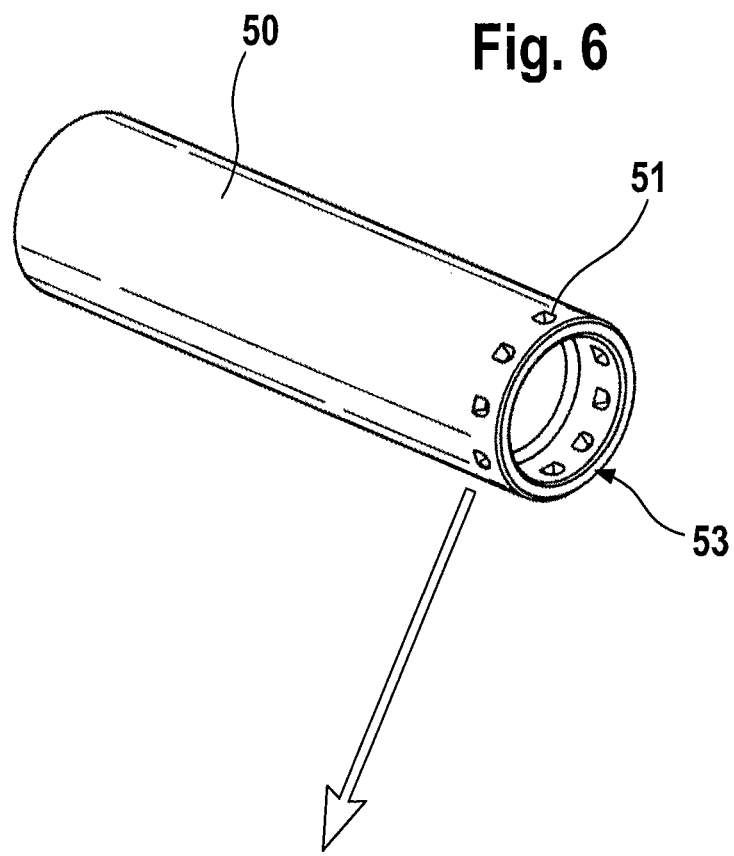
FIG. 6 shows a piston in a third illustrative embodiment in three-dimensional representation.
Figure 7:
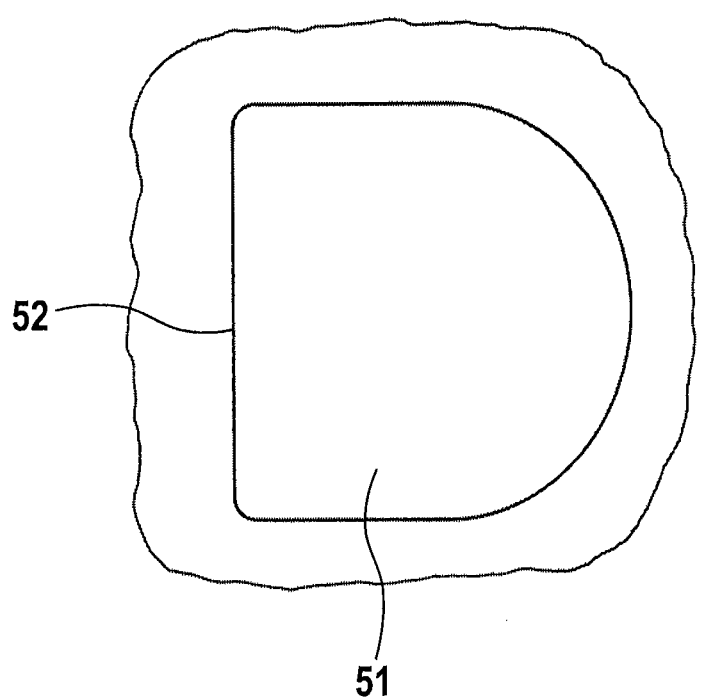
FIG. 7 shows an enlarged detail of the piston shown in FIG. 6.

FIGS. 6 and 7 show a piston 50 of a third illustrative embodiment, which can be provided as a first and/or as a second piston of the master cylinder 1. As is apparent especially from FIG. 7, which shows an enlarged detail of the piston 50, control passages 51 of the piston 50 have a control edge 52 formed parallel to a piston end face 53. In contrast to the first two illustrative embodiments, the control passages 51 are provided as radial apertures in the piston 50, which can be produced from plastic or by means of an extrusion process, as described above. Here too, the parallel control edge 52 has the advantage that the flow cross section of the control passages 52 can be enlarged while keeping the closing travel the same, thus improving the dynamic behavior of the master cylinder 1 during control interventions. The remaining shape of the control passages 51 can be adapted to the corresponding characteristics of the piston.

Another illustrative embodiment, which is not shown, envisages that the control passages begin radially and continue as a groove which extends axially under the sealing element.

LIST OF REFERENCE SIGNS 1 master cylinder
2 housing
3 piston
4 piston
5 annular groove
6 annular groove
7 sealing element
8 sealing element
9 inner sealing lip
10 inner sealing lip
11 outer sealing lip
12 outer sealing lip
13 outer side
14 outer side
15 pressure chamber
16 pressure chamber
17 replenishment chamber
18 replenishment chamber
19 control passage
20 control passage
21 wall
22 wall
23 return spring
24 return spring
25 peg
26 end
27 stop
28 sleeve
29 collar
30 collar
31 bottom
32 fixing element
33 control edge
34 control edge
35 inner groove
36 piston end face
37 collar heel
38 arm
39 fixing element
40 magnetic guide element
41 flange-shaped portion
42 recess
43 peg-shaped portion
44 magnet
45 disk
46 disk
47 support
48 collar
49 spring means
50 piston
51 control passage
52 control edge
53 piston end face
54 groove end
A actuating direction

The invention claimed is:
1. A master cylinder for a regulated braking system having at least one piston, which is movable in a housing and which is sealed off by a sealing element arranged in an annular groove of the housing from a pressure chamber, which can be connected to an unpressurized replenishment chamber by a plurality of control passages formed in the piston and distributed over a circumference of the piston, wherein each control passage comprises an axially extending groove on an outer surface of the piston that is located adjacent the sealing element, and wherein each axially extending groove includes a control edge formed on the outer surface of the piston parallel to a piston end face, and each groove has a beveled surface (i) leading from the control edge towards a base surface of the groove, and (ii) intersecting side surfaces of the groove that extend radially from the base surface of the groove.

2. The master cylinder as claimed in claim 1, wherein the axial grooves are provided in a dovetail shape.

3. The master cylinder as claimed in claim 1, wherein the control passages are provided as radial apertures in the piston.

4. The master cylinder as claimed in claim 1, wherein the control passages are provided in the piston by stamping.

5. The master cylinder as claimed in claim 1, wherein the piston is made of plastic.

6. The master cylinder as claimed in claim 1, wherein the piston is produced by an extrusion process.

7. The master cylinder as claimed in claim 1, wherein the piston is of cup-shaped design with a bottom, and a first, centrally arranged fixing element for a return spring of the piston is provided on an inner side of the bottom.

8. The master cylinder as claimed in claim 1, wherein a second, centrally arranged fixing element for a magnetic guide element is provided on an outer side of the bottom.

* * * * *